(12) United States Patent
Douglas et al.

(10) Patent No.: US 8,733,296 B1
(45) Date of Patent: May 27, 2014

(54) SURGICAL AFTER-CARE GARMENT

(71) Applicants: Brian Douglas, Knoxville, TN (US);
Debra Douglas, Knoxville, TN (US);
Evelyn Hollenshead, Knoxville, TN (US)

(72) Inventors: Brian Douglas, Knoxville, TN (US);
Debra Douglas, Knoxville, TN (US);
Evelyn Hollenshead, Knoxville, TN (US)

(73) Assignee: Pet Perils, LLC, Knoxville, TN (US)

( * ) Notice: Subject to any disclaimer, the term of this patent is extended or adjusted under 35 U.S.C. 154(b) by 75 days.

(21) Appl. No.: 13/674,237

(22) Filed: Nov. 12, 2012

Related U.S. Application Data

(60) Provisional application No. 61/561,102, filed on Nov. 17, 2011.

(51) Int. Cl.
*A01K 29/00* (2006.01)

(52) U.S. Cl.
USPC .......................................... 119/850; 119/856

(58) Field of Classification Search
USPC ............ 119/850, 856, 868; D30/145; 602/61, 602/60
See application file for complete search history.

(56) References Cited

U.S. PATENT DOCUMENTS

| | | | | | |
|---|---|---|---|---|---|
| 2,131,495 | A | * | 9/1938 | Allen | 54/79.2 |
| 2,417,803 | A | * | 3/1947 | De Mar | 54/79.1 |
| 3,738,330 | A | | 6/1973 | Alofsin | |
| 3,792,687 | A | * | 2/1974 | Ehrman | 119/868 |
| D265,516 | S | * | 7/1982 | Wacker | D30/145 |
| 4,355,600 | A | | 10/1982 | Zielinski | |
| 4,489,676 | A | * | 12/1984 | Colquist | 602/18 |
| 4,510,887 | A | * | 4/1985 | Lincoln et al. | 119/868 |
| 5,341,765 | A | * | 8/1994 | McComb | 119/850 |
| D368,338 | S | | 3/1996 | Levengood | |
| D404,852 | S | * | 1/1999 | Powell-Lesnick | D30/145 |
| 6,058,890 | A | * | 5/2000 | Harrell | 119/850 |
| 6,070,557 | A | | 6/2000 | Hibbert | |
| 6,234,117 | B1 | * | 5/2001 | Spatt | 119/850 |
| 6,267,083 | B1 | | 7/2001 | Chimienti | |
| 6,390,026 | B1 | * | 5/2002 | Sollock | 119/850 |
| 6,431,123 | B1 | | 8/2002 | Hibbert | |
| 6,443,101 | B1 | * | 9/2002 | Fazio | 119/792 |
| 6,477,988 | B2 | * | 11/2002 | Burnett | 119/850 |
| 6,481,383 | B1 | * | 11/2002 | Ross et al. | 119/850 |
| 7,284,504 | B1 | | 10/2007 | Purschwitz, Jr. | |
| 7,458,339 | B1 | | 12/2008 | Peirano | |
| D586,509 | S | * | 2/2009 | Kok-Duson | D30/145 |
| 7,793,619 | B2 | * | 9/2010 | Kajanoff | 119/850 |
| 8,015,948 | B2 | * | 9/2011 | Hall | 119/850 |
| 8,291,867 | B2 | * | 10/2012 | Blizzard | 119/850 |
| 8,302,565 | B2 | * | 11/2012 | Williams | 119/868 |
| D673,738 | S | * | 1/2013 | Lanzendorf | D30/145 |
| 8,459,211 | B2 | * | 6/2013 | Blizzard | 119/850 |
| 2004/0031448 | A1 | | 2/2004 | Trepanier | |
| 2005/0034686 | A1 | | 2/2005 | Spatt | |
| 2007/0056530 | A1 | | 3/2007 | Nassour | |
| 2008/0177210 | A1 | | 7/2008 | McDevitt Larson | |
| 2009/0205586 | A1 | | 8/2009 | Matthews | |
| 2011/0077573 | A1 | | 3/2011 | Pain | |

* cited by examiner

*Primary Examiner* — Yvonne Abbott

(74) *Attorney, Agent, or Firm* — Global IP; Esther Roberts Bell

(57) ABSTRACT

A removable garment for animals to cover and protect an abdominal surgical or wound site. Generally, the removable garment is comprised of a body wrap with front leg, rear leg, and neck closures, and an abdominal panel, extending distal the body wrap. Each leg and neck closure, as well as the abdominal panel, contains an attachment designed to removeably secure the closure, and ultimately the garment itself, to an animal.

4 Claims, 5 Drawing Sheets

SURGICAL AFTER-CARE GARMENT

CROSS-REFERENCE TO RELATED APPLICATIONS

This Application claims the benefit of U.S. Provisional Application 61/561,102, filed Nov. 17, 2011.

STATEMENT REGARDING FEDERALLY-SPONSORED RESEARCH OR DEVELOPMENT

Not Applicable.

BACKGROUND OF THE INVENTION

The present general inventive concept relates generally to an animal garment, and more particularly to a garment for quadrupeds that promotes healing by restricting motion of the quadruped, protecting an incision or wound site by securing any medication, bandages, padding, drain tubes and such related medical apparatus in the site area, and allowing attending humans access to the wound site without having to remove the entire garment.

Caring for quadrupeds after injury or surgery has long been a challenge. Unlike human patients, animals such as but not limited to dogs, coyotes, foxes, wolves, and cats—including domestic and feral cats, along with larger felines such as tigers, lions, panthers, cougars and ocelots—typically do not understand the healing requisites of reduced mobility and sterility as it pertains to a wound or surgical site. Abdominal wounds or abdominal surgery is particularly challenging due to the stretching of skin during movement, as well as the animal's tendencies to lick, scratch or otherwise access and irritate the wound site. This jeopardizes the recovery of the wound, and, ultimately, the overall health of the animal if the site is exposed to infectious contaminants.

One challenge associated with caring for a wound or incision site on animals stems from the inability to effectively adhere a bandage over the site, even when the animal's fur is shaved from the affected area. Further, non-adhesive bandages that wrap around the midsection of the animal provide insufficient protection, as these types of bandages tend to compress, shift, or otherwise distort as the animal moves about during recovery, often exposing the site and making it vulnerable to reopening, additional injury, or site contamination. Also, typically, non-adhesive bandages circumvent the entire animal's midsection, thus preventing ready access to the wound or incision site for any post-surgical treatment. In addition, such non-adhesive bandages that circumvent the midsection generally must be unwound or cut off the animal in order to be removed for post-surgical treatment of the incision site, bandage change, or other appropriate post-operative care of the animal. For any of the above-referenced traditional bandaging options, these materials (whether adhesive or non-adhesive) are usually disposable and/or of one-time useability, and not washable nor reusable.

In addition to the above bandaging matters, and health concerns for the animal, often the humans treating the animal also have additional concerns, such as fluid draining from the wound site while the animal is recovering. If left unbandaged, or, alternatively, covered with bandaging that provide insufficient protection of the wound site, the draining fluid can stain the animal's containment area, including, in the case of companion animals, floors and furniture within a home. Further, the fluid from a wound site frequently contains an undesirable odor that can be difficult to eliminate once it has soaked into porous surfaces such as upholstered furniture.

To circumvent these and related issues, various methods of bandaging and/or restraint have been introduced in the prior art. There are, however, significant voids within the art. One such void is a means to prevent the bandaging from moving upward or downward along the animal's torso, or moving to either side, and exposing the wound area. Also, there exists no site-accessible bandaging garment, such that a treating attendant can readily access the incision or wound site. Further, the animal's movement remains relatively unrestricted, thus skin movement around the wound site may result in reopening of or damage to the site.

Therefore, there exists a need for a garment for protection of a wound or incision site on an animal that prevents longitudinal and lateral shifting of the garment during use and provides for exposure of the wound or incision site for treatment without requiring removal of the garment.

BRIEF SUMMARY OF THE INVENTION

Example embodiments of the present general inventive concept provide an animal garment, and more particularly, a garment for quadrupeds that promotes healing by restricting motion of the quadruped, protecting an incision or wound site by securing any medication, bandages, padding, drain tubes and such related medical apparatus in the site area, and allowing attending humans access to the wound site without having to remove the entire garment.

The present general inventive concept, in some of its various embodiments, comprises a unified garment that wraps around the back and abdomen of the animal and is removeably secured by closures that wrap around the neck and, in some embodiments, at least one of the animal's legs. An abdominal panel extends across the animal's abdomen and is removeably secured in place. The abdominal panel allows access to the wound site. The abdominal panel, in some embodiments, can secure therein additional padding or bandaging, such as disposable gauze pads, to provide for additional protection of the wound site, absorptive material for wound fluid seepage or drainage, and similar functions. In some embodiments, the abdominal panel is designed so as to cover, longitudinally, the majority of the animal's abdomen, thus minimizing the animal's access to the site for purposes of licking, scratching, biting or otherwise invading the wound site throughout the healing process.

In some embodiments, the at least one leg closure and neck closure provide appropriate and humane restriction of the animal's movement so as to minimize any risk of additional injury to the animal such as, in some instances, movement of the skin sufficient to detach surgical closure devices or separation of wound edges during healing. In these and similar embodiments, at least one front leg closure and neck closure combine with at least one rear leg closure to also stabilize the garment, relative to the longitudinal and lateral orientation of the garment upon the animal, so as to prevent the garment from shifting forward or backward along the animal's longitudinal plane. Additionally, but separately, the at least one front leg closure and neck closure combine with the at least one rear leg closure to stabilize the garment laterally, by reducing or eliminating any lateral shift of the garment once it is secured. This longitudinal and lateral stabilization of the garment upon the animal minimizes discomfort to the animal, minimizes risk of site-access by the animal thus concomitantly minimizing risk of additional injury from licking, biting, etcetera, and, further, minimizes wound vulnerability to contaminants.

In some embodiments of the present general inventive concept, at least one lift strap can be attached to, or integrated within, the garment. In some embodiments, the at least one lift strap can be placed towards the top rear of the animal's hindquarters, thus permitting the animal's hindquarters to be moved, rotated, or lifted safely. In some embodiments, the at least one lift strap can be placed towards the top fore of the animal's shoulders, thus permitting the animal's forehand to be moved, rotated, or lifted safely. Alternatively, some embodiments feature more than one lift strap; such multiple strap embodiments can provide a hind strap towards the top rear of the animal's hindquarters and a fore strap towards the top fore of the animal's forehand to facilitate lifting the animal in its entirety or as humane restraints to keep the animal on its side while accessing the abdominal panel area. In some embodiments, separate from or in complement to the aforementioned hind and fore lift straps, other lift straps can be located at various points, such as along the flank or shoulder, to facilitate appropriate manipulation of the animal during treatment.

Operationally, in embodiments of the present general inventive concept that contain at least one lift strap, the garment construction—including leg strap design—serves to redistribute most of the lifting force from the animal's spine, abdomen, torso, or a combination of these areas, to the thigh and/or shoulder, as appropriate, thus relieving additional potential stress to the animal's abdominal region.

Additional features and embodiments of the present general inventive concept will be set forth in part in the description which follows and, in part, will be obvious from the description, or may be learned by practice of the present general inventive concept.

BRIEF DESCRIPTION OF THE DRAWINGS

The above-mentioned and additional features of the present general inventive concept will become more clearly understood from the following detailed description of the present general inventive concept read together with the drawings in which.

DETAILED DESCRIPTION OF THE INVENTION

The following detailed description may recite various descriptive terms such as horizontal, vertical, top, bottom, upward, downward, left, right, etc., when referring to the exemplary figures, but the present general inventive concept is not limited to any such terms or physical orientations. Such terms are used for convenience of description only, and could be reversed, modified, or interchanged without departing from the broader scope and spirit of the present general inventive concept.

The present general inventive concept, in some of its embodiments, includes a removable garment for an animal to removeably cover an abdominal wound site. As illustrated in FIGS. 1-7, the present general inventive concept is designed to be worn across the back on an animal and extend from approximately the neck or collar area to just above the tail. The longitudinal center of the garment extends approximately along the spine of the animal, while each edge drapes across each side of the animal's back.

Due to the extent of material that covers the animal's back and sides, it is important that the garment be constructed out of material that is lightweight, durable, and breathable so as to ensure the animal does not overheat while wearing the garment. In some embodiments, the garment is constructed of material that is washable, either by hand or, in other embodiments, via machine. In preferred embodiments, the material utilized can be relatively non-expandable, as expandable material, e.g., elastane, segmented polyurethane, etc., tend to allow excessive movement of the animal during the recuperative period. Along with provided appropriate and humane restriction of the animal's movement for the purposes of facilitating healing, another benefit of utilizing non-expandable material is the tendency to enhance calmness and reduce stress and anxiety of the animal as it feels protectively encompassed by the garment. One skilled in the art will recognize that various materials may be used to construct the garment without deviating from the scope or spirit of the present general inventive concept.

Figure 1:
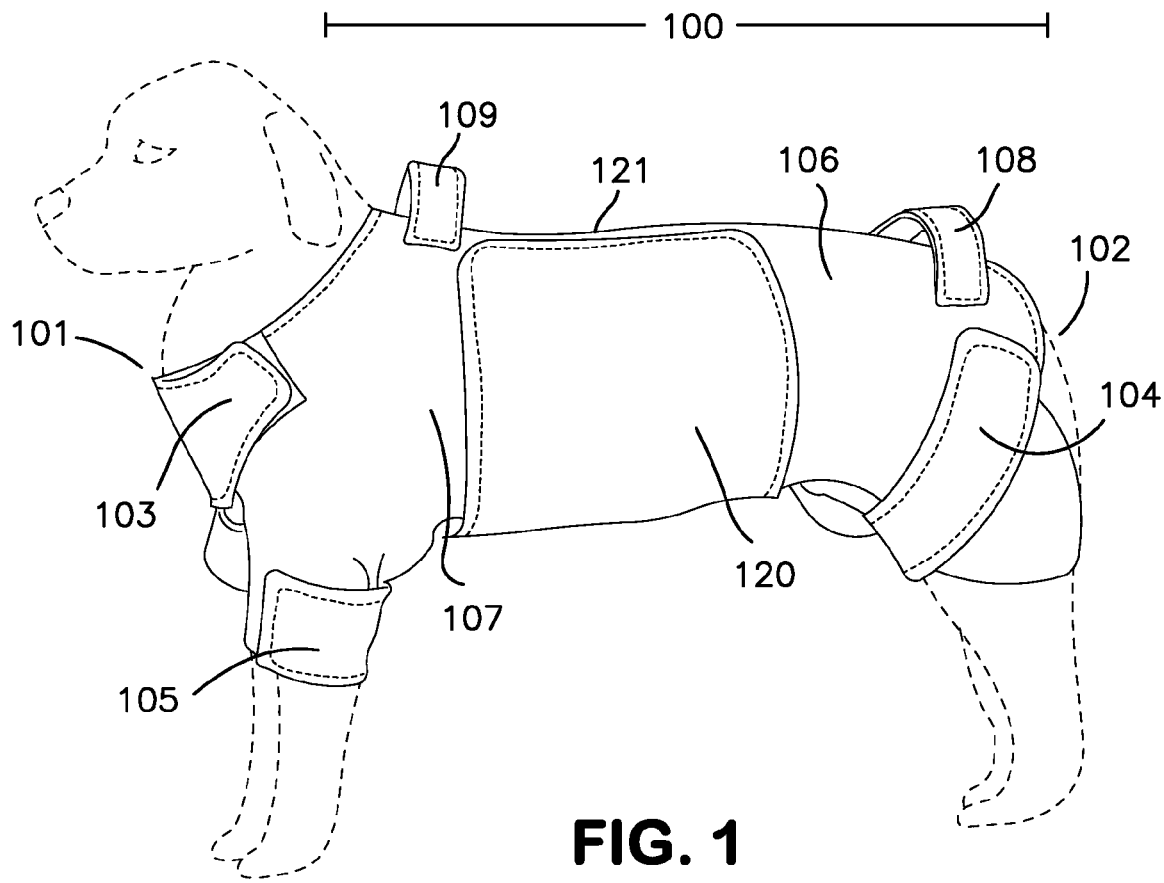
FIG. 1 is a diagram illustrating one embodiment of the present general inventive concept when fully deployed and worn by a user animal.

FIG. 1 shows an embodiment of the present general inventive concept, including the garment as one wholly-connected constructed unit, along with various component parts, with the garment shown while in use upon an animal. Body wrap 100 has an outside surface and an inside surface; when in use, the outside surface is externally visible and the inside surface is in contact with the skin, hair, or other exterior surface of the animal. FIG. 1 shows back 121 of body wrap 100 for the purposes of longitudinal orientation of the garment. Optionally, back 121 may feature darts, seaming or other minor modifications to achieve a more tailored fit depending on the species, breed, and other individual characteristics of a specific class of user animals. Abdominal panel 120 can be an integral part of the garment and constructed so as to wrap around the abdomen of the animal and be releasably securable to body wrap 100. Similarly, optional neck closure 103 can be an integral part of the garment and constructed so as to wrap around the neck of the animal at the front 101 of body wrap 100 and be releasably securable to body wrap 100. In like fashion, the at least one leg closure 104, 105 can be an integral part of the garment and constructed so as to wrap around the leg of the animal and be releasably secured upon itself (see FIG. 1, 105) or to body wrap 100 at the rear 102 of body wrap 100 (see FIG. 1, 104).

Also illustrated in FIG. 1 are two optional lift straps 108 and 109. In some embodiments, optional lift strap 108 can be attached to body wrap 100 along back 121 towards the rear 102 of body wrap 100 to facilitate lifting or moving the animal's hindquarters with minimal disturbance to the animal. In some embodiments, optional lift strap 109 can be attached to body wrap 100 along back 121 towards the front 101 of body wrap 100 to facilitate lifting or moving the animal's forehand with minimal disturbance to the animal. In addition, other optional lift straps (not shown) may be added to enhance the ability of human handlers to manipulate the animal effectively. In particular, in some embodiments, shoulder area 107 or flank area 106 of body wrap 100 can serve as placement sites for optional lift straps, either singularly or together. Inclusion of at least one optional lift strap, such as rear lift strap 108, is a significant departure from the prior art in that prior art lift straps generally direct the lifting force to the abdomen or torso of the animal, often inducing unwanted pressure upon the abdominal region. Contrastingly, embodiments of the present general inventive concept that include at least one optional lift strap, such as rear lift strap 108, directing the lifting force primarily to the stifle and hip region of the animal, thereby avoiding undue pressure upon the animal's abdominal region.

Figure 2:
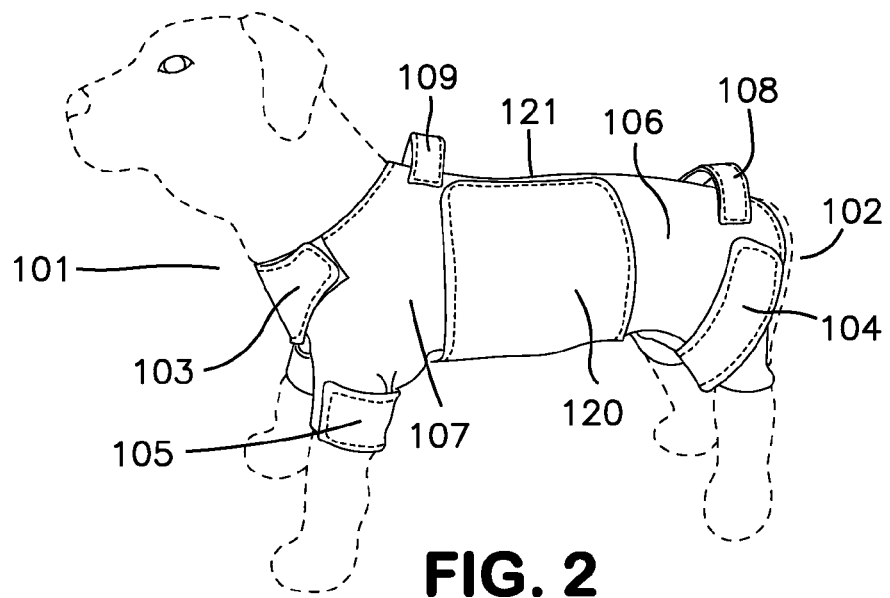
FIG. 2 is a diagram illustrating one embodiment of the present general inventive concept when fully deployed and worn by a user animal.

FIG. 2 illustrates the present general inventive concept scaled to fit a smaller animal. All other functions and features are as described herein.

Figure 3:
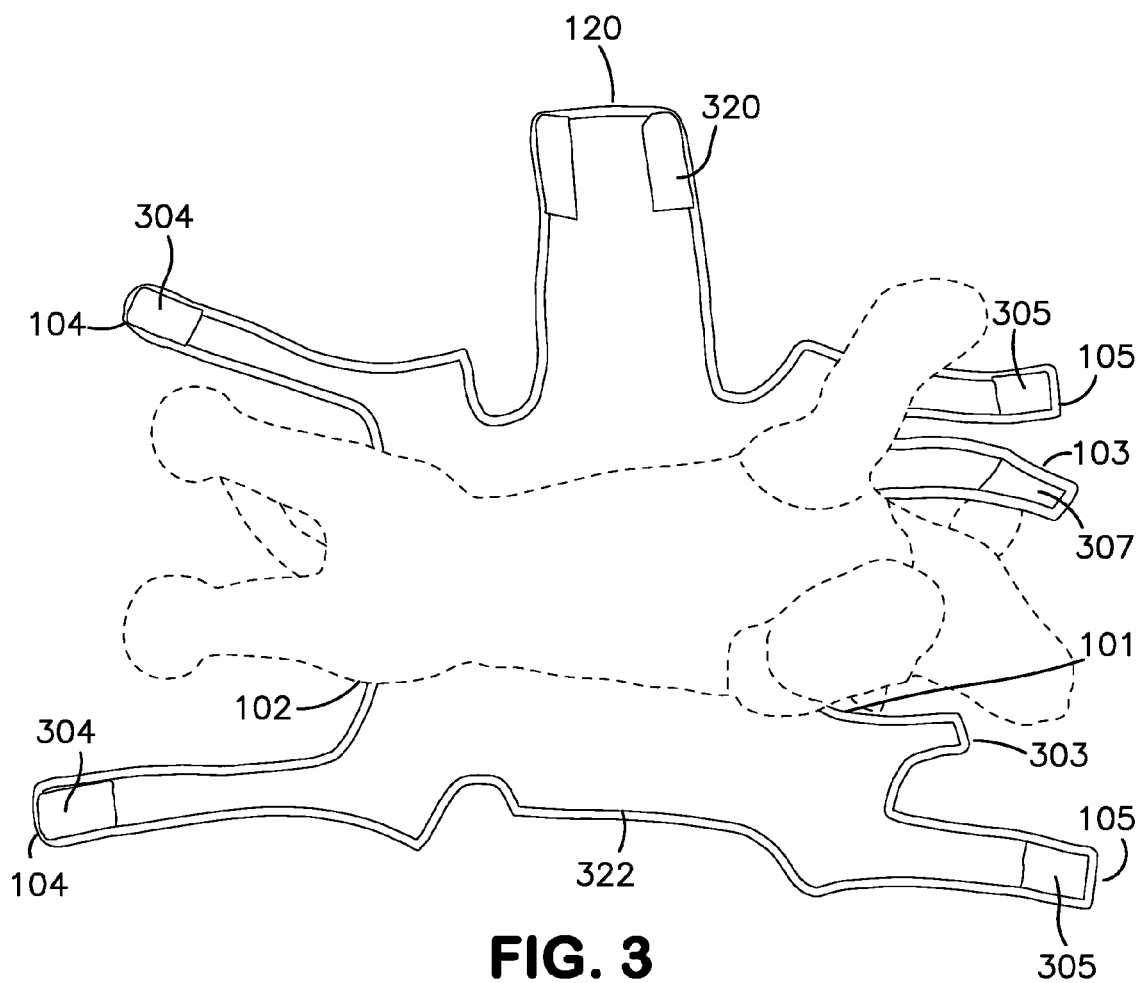
FIG. 3 is a diagram illustrating an underside view of one embodiment of the present general inventive concept when outstretched and ready to place upon a user animal.

FIG. 3 illustrates the garment when flat and ready to place upon a prone animal. As shown in FIG. 3, the inside surface of the present general inventive concept is visible in this position, with abdominal panel 120 extended and ready to wrap around the abdomen of the animal. In this and similar embodiments, two front leg closures 105 and two rear leg closures 104 extend distal the main body wrap 100. Similarly, optional neck closure 103 extends distal the front 101 of body wrap 100. In preferred embodiments, optional neck closure 103 is curved so as to follow the physiological structure of the species to be thus garmented.

Abdominal panel 120 extends distal from body wrap 100 and between front 101 and rear 102 of body wrap 100. On the inside surface of abdominal panel 120 (see FIG. 3) is a means of releasable attachment 320. In some embodiments, this releasable attachment 320 is comprised of hook-and-loop material, with hook material on the inside surface of abdominal panel 120 and loop material on the outside surface of the garment in corresponding placement so as to allow for closure of abdominal panel 120 upon being wrapped around an animal's abdomen. Alternate placement of loop material on the abdominal panel and hook material on the outside surface of the garment does not alter the overall functionality nor the spirit and scope of this means of releasable attachment 320. To encircle the animal, abdominal panel 120 is wrapped so as to rise beyond edge 322 of body wrap 100 and be releasably secured on the outside surface of body wrap 100 (see FIG. 1).

Returning to FIG. 3, optional neck closure 103 extends distal to the front 101 of body wrap 100. Contained upon the inside surface of optional neck closure 103 is a means of attachment 307 whereby to releasably secure optional neck closure 103 to an optional neck closure tab 303.

Also illustrated in FIG. 3 is at least one front leg closure 105, extending distal to body wrap 100. Affixed upon the inside surface of at least one front leg closure 105 is a means of attachment 305 whereby to releasably secure at least one front leg closure 105 upon itself, in some embodiments. Optionally, at least one front leg closure 105 may be releasably secured to shoulder area 107 of body wrap 100. Placement of the releasably securable means of attachment 305 must accommodate the mobility needs of the animal, thus, in preferred embodiments, the at least one front leg closure 105 is placed so as to encircle the foreleg below the animal's elbow but allow the elbow joint to move appropriately.

In similar fashion, at least one rear leg closure 104 extends distal from the rear 102 of body wrap 100. Affixed upon the inside surface of at least one rear leg closure 104 is a means of attachments 304 whereby to releasably secure at least one rear leg closure 104 upon itself, in some embodiments. Optionally, at least one rear leg closure 104 may be releasably secured to flank area 106 of body wrap 100. Placement of the releasably secureable means of attachment 304 must accommodate the mobility needs of the animal, thus, in preferred embodiments, the at least one rear leg closure 104 is placed so as to encircle the rear leg below the animal's hock but allow the hock joint to move appropriately.

One feature of the at least one front leg closure 105 and/or the at least one rear leg closure 104 is the ability to wrap the closure around the corresponding limb snugly but without constricting circulation or nerve tissue. Thus closed, the leg closures serve to gently restrict excessive movement such as jumping, running and the like, while allowing all leg joints to bend comfortably.

Figure 4:
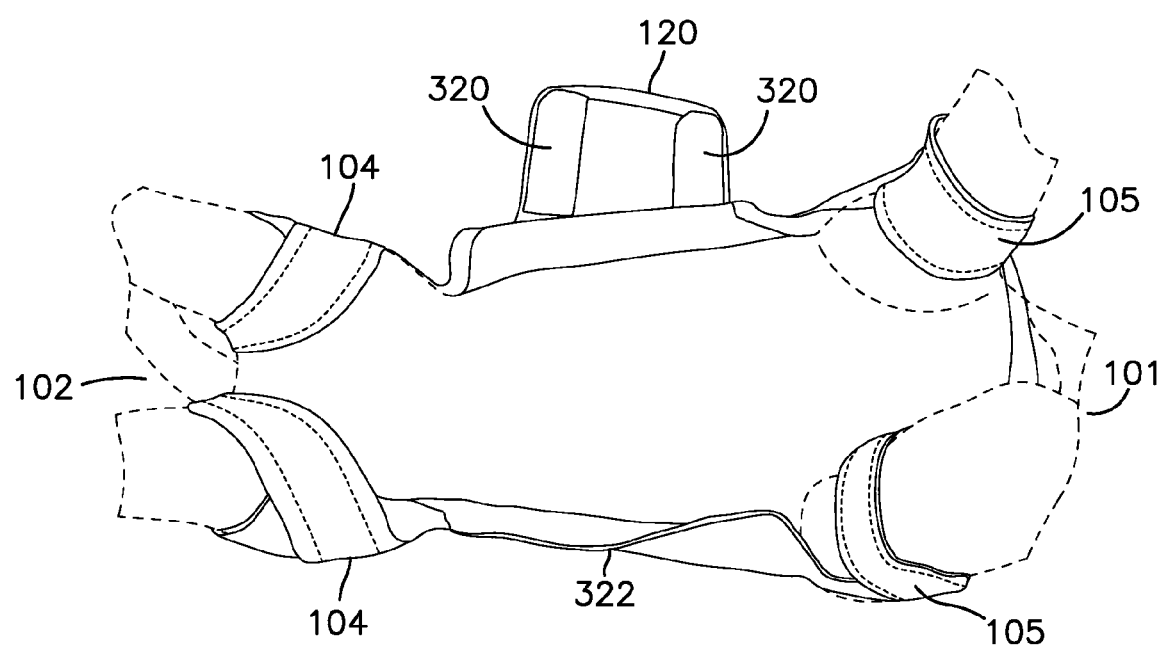
FIG. 4 is a diagram illustrating a partial view of one embodiment of the present general inventive concept where two front leg straps and two hind leg straps have been closed and the abdominal panel remains open with the animal's abdominal region accessible.

FIG. 4 illustrates one embodiment of the present general inventive concept when partially secured around an animal; for illustrative purposes only, the animal is in a prone position with the abdomen directly visible. In this and similar embodiments, at least one front leg closure 105 is shown releasably secured around the animal's foreleg. Similarly, at least one rear leg closure 104 is shown releasably secured around the animal's rear leg. In some preferred embodiments, the orientation of at least one rear leg closure 104 can be such that closure is aligned almost vertically along the animal's stifle. Also shown in FIG. 4 is abdominal panel 120, illustrated here in a folded position to show the preferred flexible character of the material utilized to make the garment. Such flexibility is not only an enhancement factor regarding fit and function, but also more comfortable for the animal and less irritating to the wound site. Means of attachment 320, such as, in some embodiments, hook-and-loop material, is shown on the inside surface of abdominal panel 120.

Figure 5:
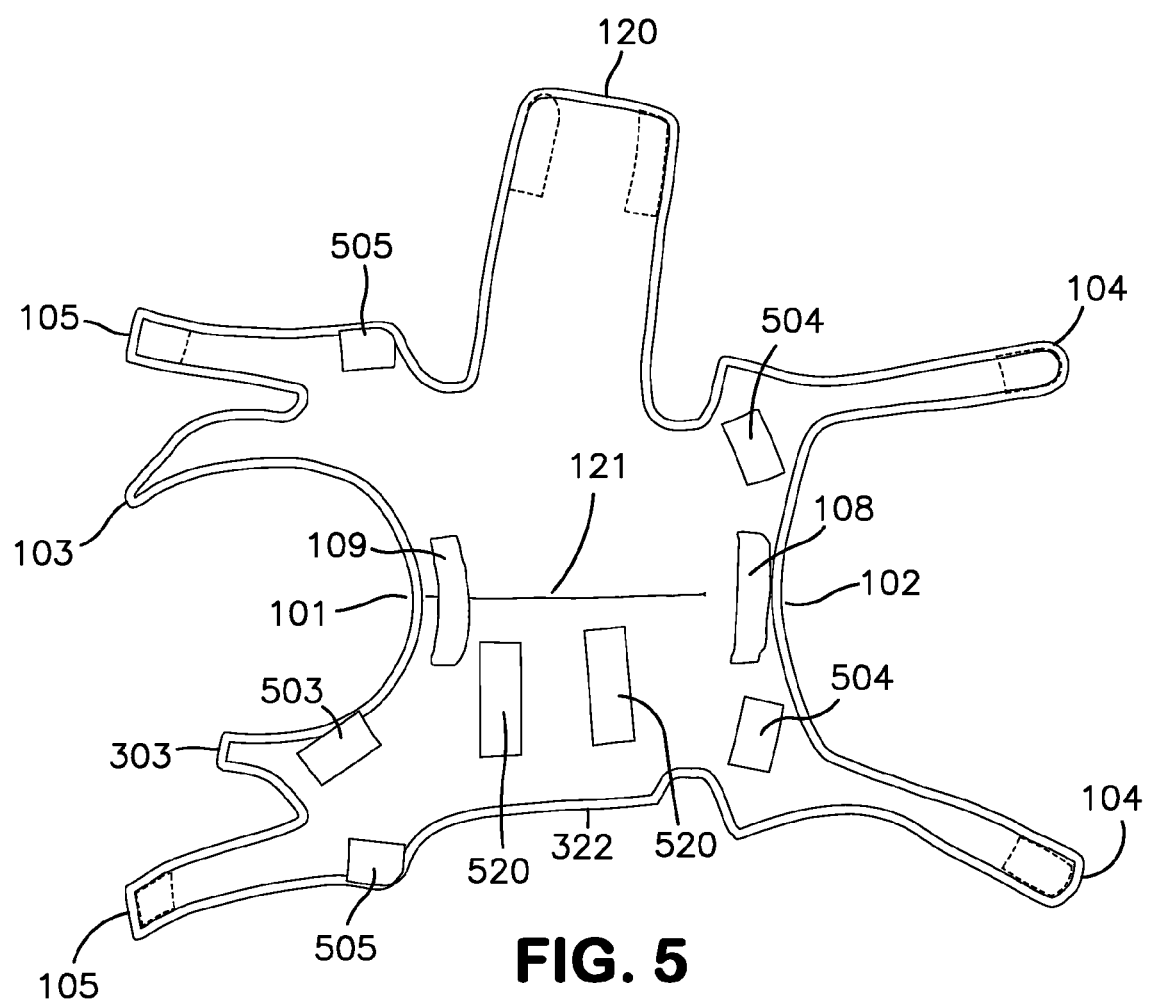
FIG. 5 is a diagram illustrating a topside view of one embodiment of the present general inventive concept.

FIG. 5 shows one embodiment of the present general inventive concept from the outside surface view. Shown and as discussed above, are the optional front lift strap 109 and rear lift strap 108. Also shown in this and similar embodiments, is optional neck closure 103 and corresponding neck closure tab 303. As shown in FIG. 5, optional neck closure 103 has a means of attachment 503 on the outside surface of body wrap 100. Similarly, each at least one front leg closure has a corresponding means of attachment 505 on the outside surface of body wrap 100. Further, each at least one rear leg closure has a corresponding means of attachment 504 on the outside surface of body wrap 100. Abdominal panel 120 has at least one means of attachment 520 on the outside surface of body wrap 100, which, in some preferred embodiments is placed in the area between edge 322 of body wrap 100 and back 121 of body wrap 100.

Figure 6:
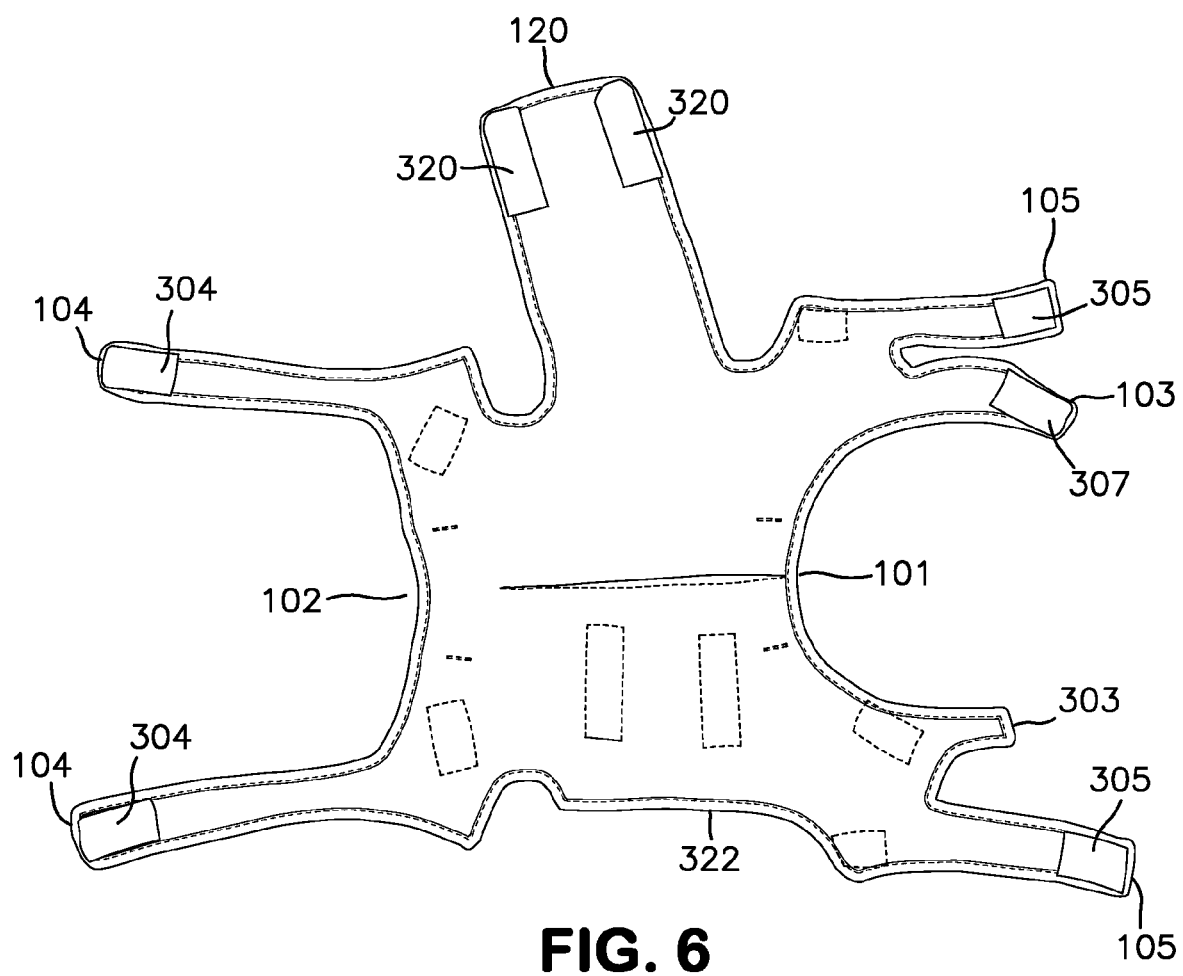
FIG. 6 is a diagram illustrating an underside side view of one embodiment of the present general inventive concept.

In FIG. 6, one embodiment of the present general inventive concept is displayed with the inside surface visible, so as to show the relative placements, in some embodiments, of the corresponding pairs of attachment means. Importantly, the means of releasable attachment referenced throughout are not limited to complimentary attachments such as hook-and-loop. For example, other attachment means, such as attachment members with buttons, studs, snaps, straps with longitudinally spaced holes and corresponding buckles, or closure members that can be tied to one another, as some examples, can also be used. One skilled in the art will recognize that the possible attachment means are not limited to those that are disclosed herein. Means for attaching garment pieces together are well known in the art and the specific attachment means for the present invention can be modified form the means disclosed herein without departing from the spirit and scope of the present general inventive concept.

Further, the specific number of closure members is not limited to that which is disclosed herein. For instance, each front leg closure 105 can have a plurality of closure members. Likewise, each rear leg closure 104 can have a plurality of closure members. The optional neck closure 103 can also be comprised of only one closure member that extends distal the body wrap 100, to wrap around the neck of an animal, with an attachment means, such as an attachment member that engages an attachment member on the garment.

Additionally, the integrally formed nature of the closure members is not required for the present general inventive concept. Separably connected closure members can be substituted for the integrally formed closure members without deviating from the scope or spirit of the present general inventive concept.

When body wrap 100 is placed upon the animal and abdominal panel 120 is releasably secured around the animal's midsection, the animal's abdomen is protected from abrasion, injury, or wholesale contamination. Further, treatment materials, such as, but not limited to, gauze pads, drain tubes, surface ointments, etc., may be utilized upon the abdomen and protected via the abdominal panel 120. Additionally, one particular advantage of preferred embodiments of the present general inventive concept is the ease of accessibility of the animal's abdomen afforded by the abdominal panel 120, due to the releasable closure of the abdominal panel 120. The body wrap 100 need not be removed from the animal in order to access the abdominal region.

While the present general inventive concept has been illustrated by description of some embodiments, and while the illustrative embodiments have been described in detail, it is not the intention of the applicant to restrict or in any way limit the scope of the appended claims to such detail. Additional modifications will readily appear to those skilled in the art. The present general inventive concept in its broader aspects is therefore not limited to the specific details, representative apparatus and methods, and illustrative examples shown and described. Accordingly, departures may be made from such details without departing from the spirit or scope of applicant's general inventive concept.

It is also noted that numerous variations, modifications, and additional embodiments are possible, and, accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Accordingly, while the present general inventive concept has been illustrated by description of several embodiments, it is not the intention of the applicant to restrict or in any way limit the scope of the present general inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

What is claimed is:

1. A removable animal garment comprising:
   a body wrap, said body wrap having an outside surface and an inside surface;
   at least one front leg closure, said at least one front leg closure having an outside surface and an inside surface integrally formed with and extending distal said body wrap, said at least one front leg closure having an attachment member on said inside surface of a distal end of said at least one front leg closure, and an attachment member on said outside surface of a proximal end of said at least one front leg closure, such that said distal end attachment member selectively engages said proximal end attachment member so as to secure said at least one front leg closure around the foreleg of an animal;
   at least one rear leg closure, said at least one rear leg closure having an outside surface and an inside surface integrally formed with and extending distal said body wrap, said at least one rear leg closure having an attachment member on said inside surface of a distal end of said at least one rear leg closure, and an attachment member on said outside surface of a proximal end of said rear leg closure member, such that said distal end attachment member selectively engages said proximal end attachment member so as to secure said at least one rear leg closure around the hind leg of an animal;
   at least one neck closure, said at least one neck closure including at least two neck closure members each containing an outside surface and an inside surface integrally formed with and extending distal said body wrap, said one neck closure member having an attachment member on said outside surface and said other neck closure member having an attachment member on said inside surface, such that said attachment members can selectively engage one another so as to secure said at least one neck closure around the neck of an animal;
   an abdominal panel including at least one abdominal closure member having an outside surface and an inside surface integrally formed with and extending distal said body wrap, said inside surface of said at least one abdominal closure member containing an attachment member; and
   an attachment member on said outside surface of said body wrap that selectively engages said attachment member on said inside surface of said abdominal closure member thus enabling the distal end of said abdominal panel to be releasably attached to said body wrap so as to cover the abdominal surface of an animal.

2. A removable animal garment comprising:
   a body wrap, said body wrap having an outside surface and an inside surface;
   a plurality of front leg closures, each said front leg closure having an outside surface and an inside surface integrally formed with and extending distal said body wrap, each said front leg closure having an attachment member on said inside surface of a distal end of each said front leg closure, and an attachment member on said outside surface of a proximal end of each said front leg closure, such that said distal end attachment member selectively engages said proximal end attachment member so as to secure each said front leg closure around the foreleg of an animal;
   a plurality of rear leg closures, each said rear leg closure having an outside surface and an inside surface integrally formed with and extending distal said body wrap, each said rear leg closure having an attachment member on said inside surface of a distal end of each said rear leg closure, and an attachment member on said outside surface of a proximal end of each said rear leg closure member, such that said distal end attachment member selectively engages said proximal end attachment member so as to secure each said rear leg closure around the hind leg of an animal;
   at least one neck closure, said at least one neck closure including at least two neck closure members each containing an outside surface and an inside surface integrally formed with and extending distal said body wrap, said one neck closure member having an attachment member on said outside surface and said other neck closure member having an attachment member on said inside surface, such that said attachment members can selectively engage one another so as to secure said at least one neck closure around the neck of an animal;

an abdominal panel including at least one abdominal closure member having an outside surface and an inside surface integrally formed with and extending distal said body wrap, said inside surface of said at least one abdominal closure member containing an attachment member; and an attachment member on said outside surface of said body wrap that selectively engages said attachment member on said inside surface of said abdominal closure member thus enabling the distal end of said abdominal panel to be releasably attached to said body wrap so as to cover the abdominal surface of an animal.

3. A removable pet garment comprising:

a body wrap, said body wrap having an outside surface and an inside surface;

at least one front leg closure, said at least one front leg closure having an outside surface and an inside surface integrally formed with and extending distal said body wrap, said at least one front leg closure having an attachment member on said inside surface of a distal end of said at least one front leg closure, and an attachment member on said outside surface of a proximal end of said at least one front leg closure, such that said distal end attachment member selectively engages said proximal end attachment member so as to secure said at least one front leg closure around the foreleg of an animal;

at least one rear leg closure, said at least one rear leg closure having an outside surface and an inside surface integrally formed with and extending distal said body wrap, said at least one rear leg closure having an attachment member on said inside surface of a distal end of said at least one rear leg closure, and an attachment member on said outside surface of a proximal end of said rear leg closure member, such that said distal end attachment member selectively engages said proximal end attachment member so as to secure said at least one rear leg closure around the hind leg of an animal;

at least one neck closure, said at least one neck closure including at least two neck closure members each containing an outside surface and an inside surface integrally formed with and extending distal said body wrap, said one neck closure member having an attachment member on said outside surface and said other neck closure member having an attachment member on said inside surface, such that said attachment members can selectively engage one another so as to secure said at least one neck closure around the neck of an animal;

an abdominal panel including at least one abdominal closure member having an outside surface and an inside surface integrally formed with and extending distal said body wrap, said inside surface of said at least one abdominal closure member containing an attachment member; and an attachment member on said outside surface of said body wrap that selectively engages said attachment member on said inside surface of said abdominal closure member thus enabling the distal end of said abdominal panel to be releasably attached to said body wrap so as to cover the abdominal surface of an animal.

4. A removable pet garment comprising:

a body wrap, said body wrap having an outside surface and an inside surface;

a plurality of front leg closures, each said front leg closure having an outside surface and an inside surface integrally formed with and extending distal said body wrap, each said front leg closure having an attachment member on said inside surface of a distal end of each said front leg closure, and an attachment member on said outside surface of a proximal end of each said front leg closure, such that said distal end attachment member selectively engages said proximal end attachment member so as to secure each said front leg closure around the foreleg of an animal;

a plurality of rear leg closures, each said rear leg closure having an outside surface and an inside surface integrally formed with and extending distal said body wrap, each said rear leg closure having an attachment member on said inside surface of a distal end of each said rear leg closure, and an attachment member on said outside surface of a proximal end of each said rear leg closure member, such that said distal end attachment member selectively engages said proximal end attachment member so as to secure each said rear leg closure around the hind leg of an animal;

at least one neck closure, said at least one neck closure including at least two neck closure members each containing an outside surface and an inside surface integrally formed with and extending distal said body wrap, said one neck closure member having an attachment member on said outside surface and said other neck closure member having an attachment member on said inside surface, such that said attachment members can selectively engage one another so as to secure said at least one neck closure around the neck of an animal;

an abdominal panel including at least one abdominal closure member having an outside surface and an inside surface integrally formed with and extending distal said body wrap, said inside surface of said at least one abdominal closure member containing an attachment member; and an attachment member on said outside surface of said body wrap that selectively engages said attachment member on said inside surface of said abdominal closure member thus enabling the distal end of said abdominal panel to be releasably attached to said body wrap so as to cover the abdominal surface of an animal.

\* \* \* \* \*